FIG. 2

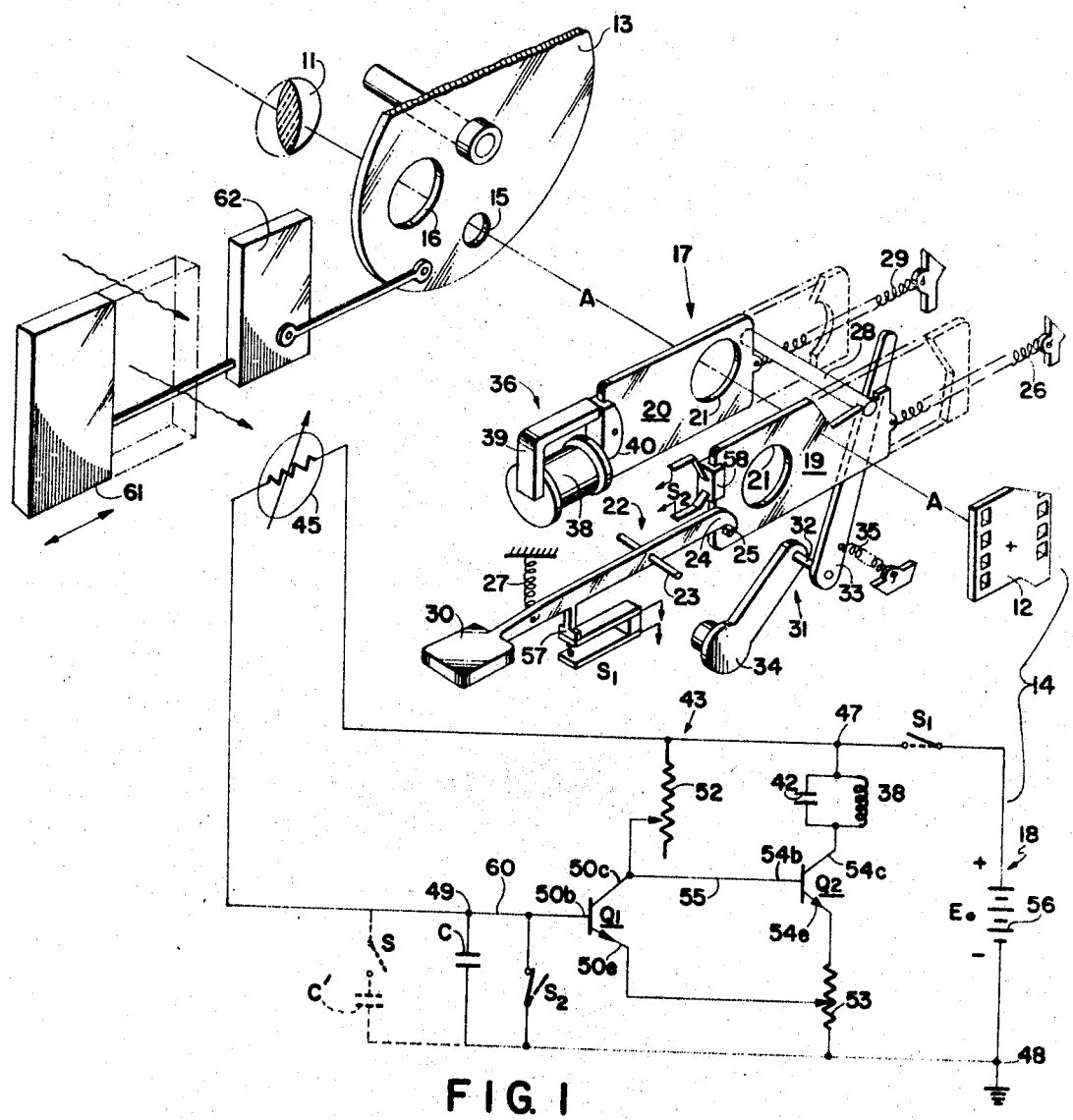

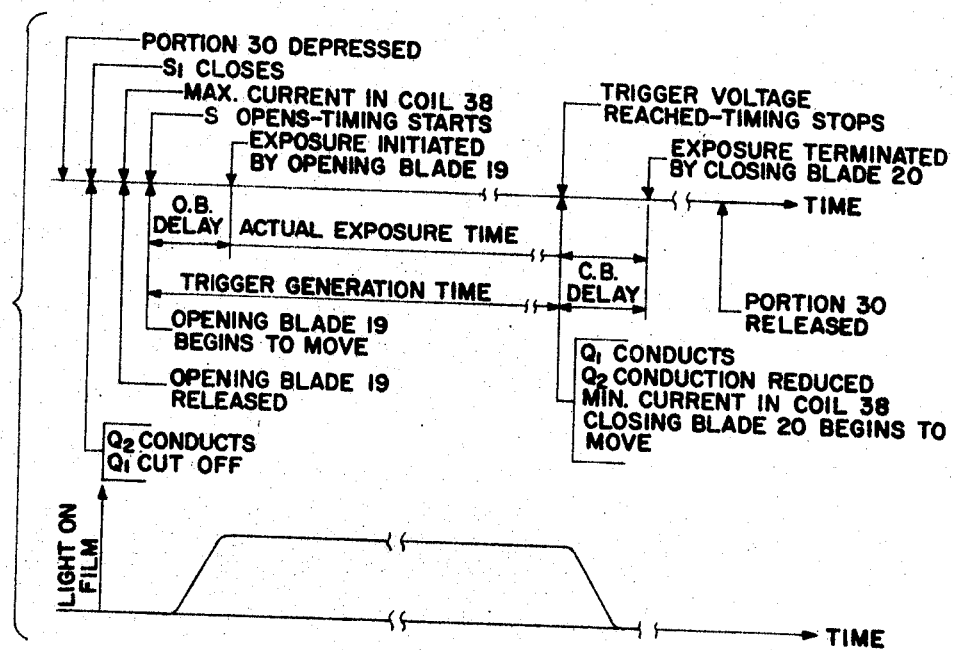

| FILM SPEED A.S.A. | BRIGHTNESS IN CDL/FT.$^2$ | | | | | | | | RELATIVE APERTURE | CAPACITORS IN THE TIMING NETWORK |
|---|---|---|---|---|---|---|---|---|---|---|
| | 6.25 | 12.5 | 25 | 50 | 100 | 200 | 400 | 800 | | |
| 3200-B&W | 112 | 56 | 28 | 14 | 7 | 3.5 | 1.75 | .875 | 42.7 | C |
| 75-COLOR | | 112 | 56 | 28 | 14 | 7 | 3.5 | 1.75 | 9.25 | C+C' |
| SHUTTER SPEED IN MILLISECONDS | | | | | | | | | | |

FIG. 3

| FILM SPEED A.S.A. | BRIGHTNESS IN CDL/FT. | | | | | | | | RELATIVE APERTURE | CAPACITORS IN THE TIMING NETWORK | POSITION OF FILTER MEANS |
|---|---|---|---|---|---|---|---|---|---|---|---|
| | 6.25 | 12.5 | 25 | 50 | 100 | 200 | 400 | 800 | | | |
| 3200-B&W | 112 | 56 | 28 | 14 | 7 | 3.5 | 1.75 | .875 | 60.3 | C | NOT LIGHT ATTENUATING |
| 75-COLOR | | 112 | 56 | 28 | 14 | 7 | 3.5 | 1.75 | 9.25 | C | LIGHT ATTENUATING |
| SHUTTER SPEED IN MILLISECONDS | | | | | | | | | | | |

FIG. 3(a)

INVENTOR.
JOHN P. BURGARELLA
BY
BROWN and MIKULKA
ATTORNEYS

United States Patent Office 3,446,129
Patented May 27, 1969

3,446,129
EXPOSURE CONTROL APPARATUS FOR PHOTOGRAPHIC CAMERA
John P. Burgarella, Sudbury, Mass., assignor to Polaroid Corporation, Cambridge, Mass., a corporation of Delaware
Filed Oct. 23, 1965, Ser. No. 503,667
Int. Cl. G01j 1/04
U.S. Cl. 95—10      2 Claims

ABSTRACT OF THE DISCLOSURE

An exposure control system for a camera incorporating an electronically timed shutter. By selectively positioning an optical filter before the photocell of an electrical timing network, the timing system is simply adjusted for proper operation with films of varying speeds. The filter which is positioned before the photosensing element is mechanically connected for sympathetic movement with the aperture adjustment mechanism of the camera.

---

This invention relates to a photographic camera having exposure control apparatus which includes electronically controlled shutter means, and more particularly to means for reducing the cost of such control apparatus.

Photographic cameras which utilize electronic shutter control apparatus must be capable of accommodating both low and high speed films. One accepted way of accomplishing the electronic timing function in such electronic shutter control apparatus is with an R-C timing network comprising a source of capacitance in series with a photoconductive element. A transient voltage generated across the source of capacitance may be used to trigger a transistorized trigger circuit controlling the actuation of the shutter means. Because of the very wide range of exposure values which must be comprehended if all types of black-and-white and color film are to be used, the timing network must provide a plurality of selectable ranges of trigger voltage generation times. Otherwise, the requisite flexibility must be built into the means controlling the relative aperture, which recourse would militate against the very worth and utility of automatic shutter control apparatus. One method of incorporating flexibility into shutter control apparatus of the type described above, is to provide a plurality of capacitors connectable in the timing circuit cumulatively or in various combinations by suitable switching means. This solution is satisfactory from a performance viewpoint; however, because of the relatively high costs involved, it has not been found to be completely satisfactory for application to low cost cameras.

Accordingly, it is the primary object of this invention to provide a photographic camera having exposure control apparatus which enables film materials having widely divergent film speeds to be used in the camera, and yet which apparatus is less expensive than presently existing apparatus performing a similar function.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a view diagrammatically illustrating exposure control apparatus embodying the invention;

FIG. 2 is an expanded time-scale diagram illustrating the chronology of events associated with effecting exposure with the apparatus illustrated in FIGURE 1;

FIG. 3 is a chart setting forth a hypothetical shutter speed-aperture program for black-and-white film (ASA-3200) and color film (ASA-75) in a prior art camera; and FIG. 3(a) is a chart setting forth a hypothetical shutter speed-aperture program for black-and-white and color film in a camera embodying the present invention.

The exposure control apparatus to be described is shown in the drawings as embodied in a camera having a particular type of shutter means, but the latter is for the purpose of illustrating the invention in a simple environment, it being understood that other types of shutter means could also be used with the control apparatus disclosed and claimed herein in order to derive the new and improved results attendant thereto.

Referring now to FIGURE 1, a portion of a camera is shown schematically as including a lens 11 for focusing light from a scene to be photographed through an aperture in a diaphragm means 13 upon film 12. Exposure of the film 12 is controlled by a shutter mechanism 14 interposed in the optical path of the light. The diaphragm means 13 may take the form of a rotatable disc having a smaller exposure aperture 15 angularly spaced from a larger exposure aperture 16.

Shutter mechanism 14 may include shutter means 17, and shutter control means 18. Shutter means 17 may take the form of a pair of planar, opaque blades 19 and 20, each provided with an exposure orifice 21. The blades 19, 20 are mounted in tracks (not shown) so as to be normal to the optical axis A—A and are reciprocable between terminal positions into intersection therewith. Each of the blades 19, 20 has one terminal position at which the solid portion overlies and totally blocks the utilized exposure aperture in diaphragm means 13 (light-blocking position), and another terminal position at which the exposure orifice is aligned with the exposure aperture (light-unblocking position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated, as the case may be. The blade that causes exposure to be initiated is called the "opening" blade (blade 19). The terminal position at which the opening blade 19 is closed is termed the "light-blocking" position, while the position intermediate the two terminal positions of the opening blade 19 at which it initiates exposure is termed the "light-unblocking" position. Conversely, the blade that causes exposure to be terminated is called the "closing" blade (blade 20). The terminal position at which the closing blade 20 is open is termed the "light-unblocking" position; the position intermediate the two terminal positions of the closing blade 20 in which it terminates exposure is termed the "light-blocking" position.

Prior to initiation of exposure, the blades 19, 20 are shown in solid lines in FIGURE 1. An actuator 22, pivotally mounted on a pin 23, includes a latch portion 24 on one end thereof which is engageable with a latch pin 25 on opening blade 19. Thus the latch portion 24 of actuator 22 is effective to retain opening blade 19 in the light-unblocking position against the bias of a spring means 26. A latch spring 27 engaging actuator 22 urges the latch portion 24 into latching engagement with pin 25. A reset bar 28 is rigidly attached to the end of blade 19 opposite exposure orifice 21, and extends normal thereto in the path of movement of closing blade 20. When the opening blade 19 is held in the light-blocking position by latch 24, bar 28 is effective to engage blade 20 to maintain the latter in its light-unblocking position against the bias of spring means 29. As can be seen from FIGURE 1, bar 28 does not interfere with the independent movement of opening blade 19 to its light-blocking position.

Such movement takes place upon manual depression of end portion 30 of actuator 22 which rotates the latch portion 24 about pin 23 out of engagement with pin 25. Upon disengagement of latch portion 24 from opening blade 19, the latter moves out of its light-blocking position toward its light-unblocking position, and bar 28 is no longer effective to maintain closing blade 20 in its light-unblocking position. However, initial movement of opening blade 19, in response to the disengagement of latch portion 24 therefrom, is effective to cause shutter control means 18, in a manner to be described later, to retain closing blade 20 in its unblocking position for a preselected period of time dependent upon the level of scene brightness. Since the opening blade 19 moves to its light-unblocking position while the shutter control means 18 releasably retains the closing blade 20 in its open position, exposure is initiated. At the end of the preselected period of time, shutter control means 18 causes closing blades 20 to be released and exposure to be terminated.

When exposure is terminated, blades 19 and 20 are in the position shown by the broken lines in FIGURE 1. That is to say, blade 19 is in its unblocking position and blade 20 is in blocking position, with reset bar 28 again engaged with blade 20. Having completed the exposure cycle, the blades 19, 20 are returned to their normal positions by reset mechanism 31 which includes reset shaft 32 rotatably mounted on the camera housing, reset lever 33 rigidly fixed to one end of shaft 32, and manual reset actuator 34 rigidly fixed to the other end of shaft 32. Spring means 35 biases lever 33 to its normal position out of the path of movement of reset bar 28. However, the manual rotation of level 33 against spring 35, achieved by the manual rotation of actuator 34 after exposure is terminated, causes lever 33 to engage bar 28 and move both blade 19 and blade 20 back to their normal, preexposure positions wherein the opening blade 19 is in its light-blocking position and the closing blade 20 is in its light-unblocking position, the blades 19, 20 being held there by the action of latch portion 24. Upon release of reset actuator 34, lever 33 returns to its normal position, and the mechanism is ready for the next exposure cycle. If desired, the manual rotation of reset actuator 34 can be coupled to a film indexing mechanism.

Shutter control means 18 includes shutter operator means 36 actuatable to cause shutter means 17 to initiate exposure, and deactuatable after said preselected period of time to cause the shutter means 17 to terminate exposure, as previously described. Specifically, operator means 36 may take the form of an electromagnet 37 which has coil 38 wound around one leg of U-shaped pole-piece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force applied to the magnetic circuit by driving a current through coil 38 is sufficient to establish an attractive force between the pole-piece 39 and the keeper 40 that exceeds the separating force exerted on the closing blade by the biasing action of spring means 29 and is sufficient to resist dynamic loads due to the shock of the bottoming of the opening blade.

Shutter control means 18 further includes shutter timing apparatus, the purpose of which is to furnish an energizing current to the coil 38 of electromagnet 37. Where the camera is to be battery operated, it is essential to minimize current drain on the battery. With this in mind, premature release of closing blade 20 is prevented and accurate control of the time that the closing blade is held in unblocking position is obtained by rapidly energizing the coil 38 just prior to the release of the opening blade 19, and effecting a rapid release of the closing blade 20 by the electromagnet 37 at the proper time.

The coil 38 must be energized before opening blade 19 begins to move out of its unblocking position, because the blade 19, through bar 28, serves to initially position keeper 40 in engagement with pole-piece 39. Once the keeper 40 has separated even slightly from the pole-piece, the reluctance of the magnetic circuit is so high, that the coil current is unable to produce an attractive force that will overcome the force of spring 29 urging the closing blade 20 to its light-blocking position.

Rapid release of the closing blade 20 from the coil 38 can be accomplished by rapidly decreasing the current furnished to the coil 38. When the current furnished to the coil 38 is rapidly reduced, a voltage is induced thereacross due to the inductance of the coil 38. The induced voltage charges capacitor 42 which shunts the coil 38 and prevents the induced voltage from damaging transistor $Q_2$. The current in the coil 38, however, rapidly decays to the point where the magnetic induction is so reduced that the force of attraction of the pole-piece 39 on the keeper 40 is less than the force of spring 29. At this point, there is an initial movement of keeper 40 as the closing blade 20 is drawn toward its unblocking position by the spring 29. The time between the instant that the current in $Q_2$ is rapidly reduced and the instant that release of the closing blade 20 is accomplished is very small in terms of an ordinary exposure interval, being only a fraction of a millisecond. For this reason, it is considered that the reduction in the conduction of $Q_2$ and the initial movement of the closing blade 20 occur at substantially the same time.

For the reason set forth above, namely, rapid switching of the current input to the coil 38 and low power consumption, the shutter timing apparatus takes the form of a transistorized, two-stage, modified Schmitt-type trigger circuit 43. The trigger circuit 43 is responsive to the output voltage from a timing network comprising a capacitor C and a photoconductive element 45, and controls the activation and deactivation of shutter operator means 36. The trigger circuit 43 has a normally not-conducting stage that includes transistor $Q_1$, preferably of a silicon type, having base, collector and emitter electrodes $50b$, $50c$ and $50e$, respectively. Collector electrode $50c$ of $Q_1$ is connected to a terminal 47 through variable bias resistor 52, and emitter electrode $50e$ of $Q_1$ is connected to a terminal 48 through variable bias resistor 53. The normally conducting stage of circuit 43 includes transistor $Q_2$ having base, collector and emitter electrodes $54b$, $54c$ and $54e$ respectively. Collector electrode $54c$ is connected to terminal 47 through coil 38 so that the latter is energized when $Q_2$ conducts. Base electrode $54b$ of $Q_2$ is connected to collector electrode $50c$ of $Q_1$ through lead 55, and emitter electrode $54e$ of $Q_2$ is connected through the bias resistor 53 to terminal 48. It should be noted that resistor 53 is in the emitter circuit of $Q_1$ and is variable to regulate the voltage at which it is desired to trigger circuit 43. While the two stages of circuit 43 have been characterized as "normally not-conducting" and "normally conducting," it should be obvious that this characterization is applicable only when a voltage source 56 is applied across terminals 47 and 48. A normally open switch 51 is connected in series with voltage source 56.

In order to apply voltage source 56, shown in the form of a battery of potential $E_O$, in such a way as to minimize current drain on the battery, actuator 22 is provided with switch operating arm 57 engageable with one of the contact blades of switch S1. When the actuator 22 is manually depressed to disengage latch 24 from opening blade 19, the contacts of switch S1 will be closed. The sequence of events that occur as a result of the depression of end portion 30 of actuator 22 will now be explained by making reference to the expanded time-scale diagram shown in FIG. 2. The initial depression of portion 30 closes the contact of S1 before the rotation imparted to actuator 22 effects disengagement of latch 24 from pin 25. Since human reaction time involved in depressing portion 30 and releasing it and the inertial delay of the actuator 22 in returning to its normal position substantially exceeds the longest average exposure apt to be used under normal "snap-shot" conditions of scene brightness, the contacts of switch S1 will be closed for at least as long as the correct exposure time.

Inspection of the $Q_2$ stage of circuit 43 indicates that base electrode 54b is the input to this stage, collector electrode 54c is the output, and emitter electrode 54e is common to the input and output. Variable resistor 52 coupled between input electrode 54b and terminal 47 acts as a base resistor for providing, when S1 is closed, a base current bias that causes $Q_2$ to conduct instantaneously with the closing of S1. The setting of resistor 52 establishes the degree to which $Q_2$ conducts so that the current through coil 38 can be adjusted to provide the proper magnetomotive force in the magnetic circuit of electromagnet 37 for preventing accidental release of closing blade 20 when the opening blade 19 moves to its light-unblocking position to initiate exposure. The flow of current through resistors 52 and 53, when $Q_2$ conducts, establishes at the collector and emitter electrodes of $Q_1$, bias voltages having first values dependent upon the magnitudes of the respective currents and resistance values.

Until the initial displacement of the opening blade 19 out of it blocking position, a conductive block 58 on the opening blade 19 engages the contacts of S2 whereby the latter is closed. Connection 49 is at an initial value of voltage, namely, ground potential, at the instant S1 is closed. When the voltage at connection 49 is at its initial value and the voltages at the collector and emitter electrode 50c, 50e of $Q_1$ are at their first values of bias voltage due to the conduction of $Q_2$, the collector-base and emitter-base junction of $Q_1$ being cut off. For this reason, it may be said that the bias of $Q_1$ is primarily established by the voltage at connection 49.

Meanwhile, the current through the coil 38 builds rapidly to its maximum value causing the maximum retaining force to be exerted on the closing blade 20 shortly after S1 is closed and just prior to the total disengagement of latch 24 from pin 25 which releases the opening blade 19 for movement out of its light-blocking position. The initial movement of the opening blade 19 causes conductive block 58 to disengage the contacts of S2, thereby opening the same and causing the voltage source 56 to be applied across the timing network. The timing network includes capacitor C in series with photoconductive element 45, which may be a cadmium sulfide photocell or the like having a resistance inversely related to the brightness level of the scene to which the element 45 is exposed. The capacitor C and element 45 are connected between terminals 47 and 48 to form an integrator circuit whose input is at terminal 47 and whose output is at terminal 49. Terminal 49 is connected by lead 60 to base electrode 50b of $Q_1$, the latter electrode constituting the input electrode of that stage.

The opening of S2 activates the timing network, which is to say that the latter is caused to generate, at connection 49, a voltage having an initial value (in this case ground potential) which causes $Q_1$ to be reverse biased to cut-off. The voltage at connection 49 then changes with time, reaching a preselected value, termed the trigger voltage which forward biases $Q_1$, in a period of time termed the trigger voltage generation time.

When the voltage at connection 49 reaches the trigger voltage, it causes the emitter-base junction of $Q_1$ to be forward biased. Now, element 45 functions like a base resistor whose value is dependent upon the level of scene brightness and provides base current bias that causes $Q_1$ to conduct, producing collector current at the output electrode 50c thereof which flows through resistor 52 increasing the voltage drop thereacross and lowering the voltage at the input electrode 54b of $Q_2$. This reduces the forward bias on $Q_2$, thus decreasing the flow of current through the latter and causing a reduction in the voltage drop across bias resistor 53. As the voltage drop across resistor 53 decreases, the forward bias of $Q_1$ increases even more. This regenerative feedback between the stages will cause conduction to switch rapidly from $Q_2$ to $Q_1$. The conduction of $Q_2$ is severely and rapidly reduced, thereby deenergizing coil 38 to effect a sharp release of the closing blade 20.

When the closing blade 20 is released, it begins to move out of its unblocking position and will terminate exposure at its blocking position as explained previously. Thus, the shutter means 17 terminates exposure in response to deactivation of the shutter operator means 36. Referring again to FIG. 2, it can be seen that the time interval between when timing starts (the opening of S2) and when stops (the trigger voltage is reached), will be exactly the same as the time interval between when exposure is initiated and when exposure is terminated, provided only that the opening blade delay equals the closing blade delay, even though the two time intervals are not concurrent throughout. This disclosure assumes the delay times are essentially the same, so that the actual exposure time is essentially the same as the trigger voltage generation time.

Referring again to FIG. 2, it is apparent that the time interval between the release of the opening blade 19 and its initial movement to open S2 can be made extremely small by the application of sufficient spring bias to the blade 19. Furthermore, the time between the closing of S1 and the attainment of maximum restraining force on the closing blade 20 by the electromagnet 37 can likewise be made extremely small by various expedients. Thus, all the events that occur between the closing of S1 and the opening of S2 can be said to occur substantially at the same time, particularly since the time interval involved is a minute fraction of the actual exposure time. This disclosure therefore assumes that the actual exposure time is essentially the time that the current through the coil 38 is sufficient to maintain the closing blade 20 in its light-unblocking position, or, in other words, the time that the shutter operator means 36 is activated.

The operation of a shutter mechanism 14 which may form a part of the inventive combination has been described above. As discussed above, because of the very wide range of exposure values which must be comprehended by the shutter control means, a plurality of selectable ranges of trigger voltage generation times must be provided by the timing network. In electronically controlled shutters representing the present state of the art, a rather costly arrangement is utilized to provide a plurality of selectable ranges of trigger voltage generation times. In FIGURE 1 a capacitor C′ and a switch S have been shown in phantom lines to represent the way in which a plurality of ranges of trigger voltage generation times are provided by certain prior art devices. When it is desired to alter the range of trigger voltage generation times, switch S is closed, connecting capacitor C' in parallel with capacitor C. The effective capacitance in the timing network with switch S closed is equal to C'+C. The increased capacitance in the timing network will result in a range of longer trigger voltage generation times. As mentioned above, the addition of capacitor C' in the prior art arrangements is costly, requiring the additional capacitor C', and the switch S. With a high volume, low-cost camera, such additional expense is apt to be burdensome.

In accordance with the primary object of this invention, other means have been provided for furnishing a plurality of selectable ranges of trigger voltage generation times which means do not require the addition of capacitance. This means comprises a filter means, illustrated diagrammatically at 61, movable between a first position and a second position. In the first position, shown in phantom lines in FIGURE 1, the filter means 61 is positioned in front of the photoconductive element 45 and attenuates a portion of the scene light to which the element 45 is exposed. In the second position, shown in unbroken lines in FIGURE 1, the filter means 61 completely exposes the photoconductive element 45 to light from the scene. The filter means 61 may comprise a neutral density filter or any other suitable light-attenuating means.

When the filter means 61 is in its first (light-attenuating) position, the effect is to increase the resistance, for a given level of scene brightness, of the photoconductive element 45. Increasing the resistance in the R-C timing network increases the time required to generate a predetermined voltage across capacitor C. Thus, movement of the filter means 61 into the light-attenuating position (first position) effects an increase in the range of trigger voltage generation times attainable. Conversely, movement of the filter means 61 out of its light-attenuating position to its second position provides a range of shorter trigger voltage generation times.

In order that a single manual operation will effect not only a movement of the filter means 61 from a light-attenuating position to a position wherein the scene light is not attenuated, and at the same time a change in the relative aperture is accomplished, coupling means 62 is provided between the filter means 61 and the diaphragm means 13. The coupling means 62 is illustrated diagrammatically in FIGURE 1. FIGURE 1 illustrates the coupling means 62 as translating rotary motion of the diaphragm means 13 into reciprocatory motion of the filter means 61; however, it is evident that reciprocatory motion of a linearly movable diaphragm means could be translated into arcuate movement in the filter means 61. Other possibilities include direct coupling by the coupling means 62 to the filter means 61 of rotational or reciprocatory movement of the diaphragm means 13.

The above description may be clarified by reference to FIGS. 3 and 3(a). FIG. 3 is a chart illustrating a hypothetical shutter speed-aperture program for black-and-white (ASA-3200) and color (ASA-75) film in a prior art camera, of the type described above, wherein a plurality of ranges of trigger voltage generation times are provided by adding capacitance in the timing network. FIG. 3(a) is a similar chart showing, for comparison purposes, a hypothetical shutter speed-aperture program in a camera utilizing the present invention. As described above, the shutter speed can be assumed to be approximately equal to the trigger voltage generation time. The important observation to be made from a comparison of the charts of FIGS. 3 and 3(a) is that the same two ranges of shutter speeds (trigger voltage generation times) are accomplished with a single capacitor with the present invention (FIG. 3(a)) whereas in the prior art arrangement (FIG. 3) two capacitors, C and C', are required. The one stop change in shutter speeds (trigger voltage generation times) is accomplished, by the present invention, by interposing the filter means in the light path from the scene to the photoconductive element when the slower speed film and larger relative aperture are employed.

Thus, by this invention, expedient and inexpensive means have been provided for a camera having electronic shutter control apparatus by which the relative aperture may be changed and, simultaneously, the range of trigger voltage generation times may be altered in order that films having widely divergent speed ratings may be accommodated in the camera.

Certain changes may be made in the above apparatus without departing from the scope of the invention herein involved. For example, using the principles of this invention, apparatus could be constructed by one skilled in the art which provides three or more, rather than two, selectable combinations of ranges of trigger voltage generation times and relative exposure apertures. It is, therefore, intended that all matter contained in the above description or shown in the accompanying drawings shall be interpreted as illustrative and not in a limiting sense.

What is claimed is:

1. A photographic camera having an exposure aperture for exposing photosensitive materials and comprising:
  (a) shutter means properly positioned relative to said exposure aperture for selectively uncovering and covering said aperture such that the amount of light admitted during exposure depends on the area of the exposure aperture and the duration said aperture is uncovered;
  (b) means for causing said shutter means to initiate exposure;
  (c) shutter operator means effective while activated to cause said shutter means to maintain exposure;
  (d) means for causing said shutter means to terminate exposure upon deactivation of said shutter operator means;
  (e) a voltage sensitive trigger circuit for controlling the activation and deactivation of said shutter operator means, said trigger circuit including a transistor having an input;
  (f) an electrical timing network including in series capacitance means and a photoconductive element exposed to light from the scene to be photographed, said element having an electrical parameter which varies in dependence on the intensity of the light incident thereon;
  (g) means coupling the voltage generated across said capacitance means to said input;
  (h) means for activating said network and said shutter operator means at substantially the same time immediately prior to initiation of exposure, whereby upon activation of said network, the voltage across said capacitance means rises, in a time termed the trigger voltage generation time, from a level effective to reverse bias said transistor to a trigger voltage wherein said transistor conducts to cause said shutter operator means to be deactivated and the exposure to be terminated;
  (i) selectively adjustable diaphragm means for varying the size of said exposure aperture between at least two different effective areas corresponding to the film speeds of different photosensitive materials;
  (j) light-attenuating means effective when in a first position to attenuate a portion of the scene light to which said element is exposed, said light-attenuating means being ineffective when in a second position to attenuate any of the scene light to which said element is exposed; and
  (k) coupling means between said diaphragm means and said light-attenuating means for positioning said attenuating means in said first position when said diaphragm means defines the larger of said two exposure aperture areas and for positioning said light-attenuating means in said second position when said diaphragm means defines the smaller of said two exposure aperture areas, whereby with a constant scene brightness and a constant value of said capacitance means, varying the size of said exposure aperture with said diaphragm means effects an alteration in the position of said light-attenuating means and in said trigger voltage generation time.

2. The invention defined by claim 1 wherein said light-attenuating means comprises a neutral density filter.

References Cited

UNITED STATES PATENTS

| | | | |
|---|---|---|---|
| 1,870,464 | 8/1932 | Ramsey | 352—141 |
| 2,080,055 | 5/1937 | Martin | 352—141 |
| 3,062,092 | 11/1962 | Schmidt | 95—10 |
| 3,200,723 | 8/1965 | Topaz | 95—10 |
| 3,205,799 | 9/1965 | Burgarella et al. | 95—10 |
| 3,205,803 | 9/1965 | Burgarella et al. | 95—10 |
| 2,278,338 | 3/1942 | Tonnies | 95—10 |
| 3,027,818 | 4/1962 | Lee et al. | 95—10 |
| 3,276,339 | 10/1966 | Anwyl | 95—10 |
| 3,379,107 | 4/1968 | Lieser et al. | 95—10 |

NORTON ANSHER, *Primary Examiner.*

R. A. SCHROEDER, *Assistant Examiner.*